Oct. 27, 1959 R. M. WOLFE 2,910,670

ELECTRICAL CIRCUITS

Filed July 25, 1955

INVENTOR
R. M. WOLFE
BY
ATTORNEY 2,910,670

ELECTRICAL CIRCUITS

Robert M. Wolfe, Colonia, N.J., assignor to Bell Telephone Laboratories, Incorporated, New York, N.Y., a corporation of New York Application July 25, 1955, Serial No. 523,956

4 Claims. (Cl. 340—174)

Figure 1:
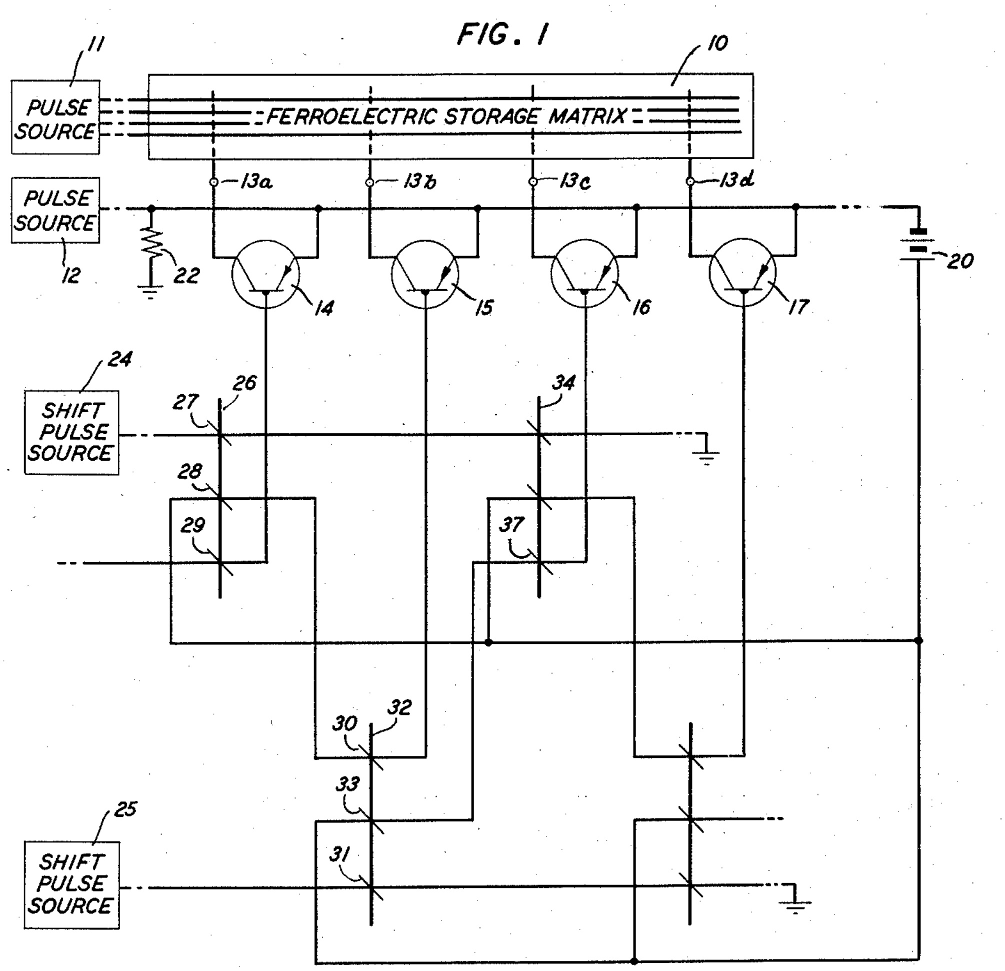

This invention relates to electrical circuits and, more particularly, to shift register circuits utilizing magnetic cores.

The prior art discloses numerous examples of shift registers employing magnetic cores. One example of such shift registers is found in the article by An Wang and Way Dong Woo, "Static Magnetic Storage and Delay Lines," Journal of Applied Physics 21, page 49, January, 1950. Generally in prior shift registers, unilateral impedances have been connected between adjacent cores. These impedances are employed to restrict the transfer of stored pulses to only the forward direction and to disconnect the load from the core being set. The shift register in the Wang and Woo article further utilizes a resistance connected in series with these unilateral impedances to restrict the amount of current transferred between stages to that value which will reverse the remanent polarization of only the next succeeding core and to prevent an effective shorting out of the output coil of the driving core due to the sudden switching of the subsequent core, which would otherwise appear as a short circuit to the output coil of the driving core. In other prior shift registers, batteries have been utilized to back-bias the unilateral impedances to augment the natural threshold of these impedances.

In each of the above examples of shift registers as disclosed in the prior art, the output wave form was a continuous integral of the input current and hence was irregular in shape. In the instance when a digit was derived at the output, this digit was larger in magnitude than the output derived when no digit or a zero was derived. These wave forms were not readily adapted to use in conjunction with storage circuits, and they were always pulses of the same polarity, thus not directly usable in circuits requiring pulses applied thereto of either polarity. Further, prior shift registers have not produced a parallel output from each stage of the shift register, nor has there been any provision for isolation between the shift register and its associated load.

Accordingly, it is an object of this invention to provide an improved shift register utilizing magnetic cores.

It is another object of this invention to provide isolation between parallel outputs of a shift register circuit and its associated load.

It is another object of this invention to provide a magnetic core shift register circuit adapted to provide output pulses of any desired shape, voltage and polarity.

It is a further object of this invention to provide output gates for a magnetic core shift register circuit which are simple in configuration, reliable in operation, requiring a minimum number of parts, and which perform a multitude of functions in the shift register circuit.

It is still another object of this invention to eliminate the necessity for diodes or rectifiers connected between the stages of a magnetic core shift register circuit.

In one specific illustrative embodiment of this invention, magnetic cores and transistors are interconnected to act as a shift register and gating circuit. Each core of the shift register has an output winding thereon which is connected to a set winding of a subsequent core and to the base of a transistor, the output winding having a larger number of turns than the set winding on each core. A source of cut-off bias and a signal source which is to be gated are connected to the emitters of each of the transistors. A suitable load, such as a storage medium, is connected to the collectors of each of the transistors. Each transistor performs multifold functions, in accordance with an aspect of this invention, acting as a rectifier, a resistance, and a gate capable of delivering an output to the load which is a reproduction of the emitter input signal regardless of its polarity. The characteristic of the transistor is such that its base-emitter circuit presents a unilateral impedance to the output winding of the associated magnetic core and thus restricts the transfer of the pulses between the cores to transfer of pulses in the forward direction only through the shift register and prevents loading of a core being set. Further, this impedance also exhibits a certain resistive characteristic which tends to isolate the core circuit from the gating circuit. The bias applied to the transistor emitter maintains the transistor in a normally cut-off condition and also increases the threshold of the unilateral impedance thereby preventing false gating.

The emitter-collector circuit of the transistor acts as a gate which is adapted to reproduce the emitter signal irrespective of its polarity. This sequential gating circuit may be used with a ferroelectric matrix to gate the store and read-out pulses relative to the matrix. This is achieved by connecting a source of bipolar pulses to the transistor emitters and connecting each of the transistor collectors to an electrode of the ferroelectric matrix.

As is well known in the art, a pulse may be stored in a selected condenser of the ferroelectric matrix by simultaneously applying pulses to the row and column electrodes of that condenser of a magnitude each insufficient to switch the remanent polarization of the dielectric material but of proper polarity and magnitude when combined to produce the required reversal of polarization, as in J. R. Anderson Patent 2,695,397, issued November 23, 1954.

By connecting each of the column electrodes of the ferroelectric matrix to a bipolar pulse source and employing serially connected transistors interposed between this pulse source and each column electrode, the application of pulses to the column electrodes may be controlled by selectively rendering the transistors conductive. This function of selectively rendering the transistors conductive is accomplished by means of the previously described ferromagnetic shift register and gating circuit in which a single pulse is stored. Upon the transfer of this stored pulse to the subsequent core, the transistor associated with this second core is rendered conductive, thereby permitting an application of a pulse from the pulse source to the ferroelectric storage condenser column electrode. Similar circuitry may be employed to control the application of a complementary storage pulse to the row electrodes of the matrix; the employment of transistor gates for ferroelectric storage circuits is further disclosed in J. R. Anderson application Serial No. 524,081, filed July 25, 1955.

Accordingly, it is a feature of this invention that a transistor be connected in series with the output winding of each magnetic core of a shift register circuit and the input winding of the succeeding core, the transistor acting as a gate to control the output from each stage of the shift register circuit as well as acting as a unilateral impedance to restrict the switching of the ferromagnetic cores in the shift register to the forward direction and to restrict loading of a core being set.

It is another feature of this invention that a load circuit requiring parallel inputs from a shift register circuit be connected to each of the transistors, a pulse source of either polarity also being connected to the transistors and the application of the pulses from the pulse source to the load circuit being determined by the information stored at each stage of the shift register circuit.

Figure 2:
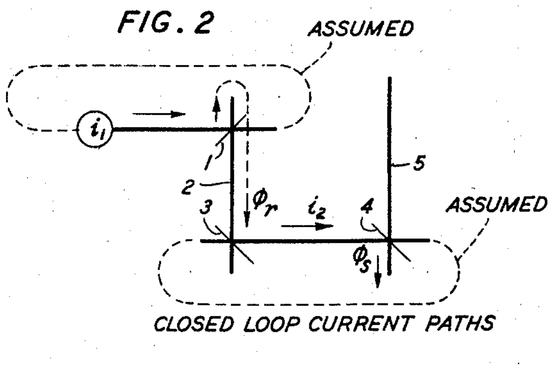

A complete understanding of this invention and of these and other features thereof may be gained from consideration of the following detailed description and the accompanying drawing in which:

Fig. 1 is a schematic representation of one specific illustrative embodiment of this invention; and Fig. 2 depicts a mirror symbol notation for schematics of magnetic core circuits as used to describe this invention.

In one specific illustrative embodiment of this invention, a first or odd group and a second or even group of magnetic cores are alternately serially connected such that pulses in the odd groups are transferred to the even group and retransferred to the next succeeding core of the odd group progressively throughout the shift register subject to the control of a pair of pulse sources each associated with one of the core groups. The output from each core is connected to a base of a transistor such that when a pulse is transferred to that core a current is developed in the winding associated with the transistor to overcome the cut-off bias applied to that transistor thereby rendering it conductive. When conduction occurs in the transistor, pulses from a pulse source connected to an emitter of the transistor are applied to that column electrode of the ferroelectric storage matrix associated with the transistor rendered so conductive.

Reference is made to Fig. 2 for the purpose of faciliating an understanding of the symbols of Fig. 1. This figure depicts mirror symbols which are discussed extensively in an article entitled "Pulse Switching Circuits Using Magnetic Cores" by M. Karnaugh, published in Proceedings of the I.R.E., volume 43, Number 5, pages 570 through 583.

As depicted in Fig. 2 of the accompanying drawing, the heavy vertical lines each represent a magnetic core. The short lines defining 45 degree angles with the cores represent windings on the core and are termed winding mirror symbols. The horizontal lines through the intersection of these vertical and 45 degree lines represent the circuits connected to the windings. When a current flows into a winding, the resulting magnetic flux can be obtained by "reflecting" this current off the winding mirror symbol. In order to determine the current induced in the remaining windings of the magnetic core, the flux lines so produced are projected around the end of the magnetic core and reflected off each of the remaining winding mirror symbols. As shown in Fig. 2, $i_1$ is the current directed into winding 1 of ferromagnetic core 2, and the resultantant flux is illustrated by the arrows designated $\phi_r$. By projecting $\phi_r$ upon winding 3 of core 2 the direction of current $i_2$ is obtained as being to the right. Similarly, when current $i_2$ is applied to winding 4 of core 5, a flux $\phi_s$ will be produced in the downward direction. An upward applied magnetic field is assumed to leave the core in its set state and consequently a downward field will leave the core in its normal state.

In the embodiment of this invention depicted in Fig. 1, a ferroelectric storage matrix 10 is connected by its row electrodes to pulse source 11. Each of the column electrodes of the matrix 10 is connected to pulse source 12 through serially connected transistors 14, 15, 16 and 17. The emitters of each of the transistors are connected to a point between bias battery 20 and resistor 22 such that the transistors are maintained in a nonconducting state. While only four transistors are shown, it is to be understood that larger size matrices may be employed in other embodiments of this invention, each column electrode being serially connected to pulse source 12 through a transistor and each transistor being connected to the output of a stage in the shift register. These transistors are sequentially rendered conductive by the operation of the magnetic core shift register under the control of shift pulse sources 24 and 25.

In accordance with an aspect of this invention, the output winding of one core of the shift register circuit is directly connected to the input winding of the subsequent core of the shift register circuit, no rectifying or unilateral circuit element being included between these two windings; instead the transistors 14, 15, 16 and 17 are connected to each input winding and serve, among their other functions, to limit current flow in the series path defined by these windings to the forward direction, thereby preventing information erroneously being transferred in the reverse direction in the shift register circuit. Advantageously, transistors 14, 15, 16 and 17 are symmetrical transistors whereby pulses of either polarity may be applied from source 12 and gated under control of the pulses derived from the shift register circuit. It is to be understood, however, that other types of transistors may be employed and that such transistors may be differently connected in other specific embodiments of this invention. Thus, the pulse source 12, input windings of the shift register cores, and bias source 20 may be applied to various of the base, collector and emitter electrodes in other embodiments of this invention.

Assume for the purpose of explanation that a pulse has been stored in magnetic core 26 and no pulse is stored in the remaining cores. Upon the application of a positive pulse from source 24 to winding 27 of core 26, a flux will be produced in a downward direction in core 26, as can be seen by the use of the mirror symbols, and this flux will oppose the previously stored remanent magnetization. In response to the reversal of the magnetization, a voltage will be induced in coil 28 and current will flow from right to left through coil 28 and through coil 30 of core 32; the direction of the flow of current in coil 28 may be determined by projecting the flux arrow around the end of the core and upward against mirror symbol 28. The current flowing in winding 30 of core 32 causes a reversal of magnetization in that core; the direction of the flux produced by this current in core 32 again may be determined by projecting the current upon mirror symbol 30. As can be then seen, this flux is in an upward direction so that the pulse previously stored in core 26 is now stored in core 32. The current, which flows through both coils 28 and 30, also flows to the base of transistor 15, rendering that transistor conductive to current from source 12, thus permitting the application of the pulse from source 12 to the column electrode **13*b* of the ferroelectric matrix 10. The bias of source 20 can be considered to be overcome by the voltage applied to the base of the transistor 15 due to the reversal of magnetization of core 26**.

On reversal of the magnetization of core 26, current will not flow through coil 29 because the voltage induced across coil 29 is insufficient to overcome the bias of source 20 as coil 29 comprises fewer turn than coil 28. Accordingly, transistor 14 will not be rendered conductive and the possibility of a backward transfer of information from core 26 to the preceding core in the shift register circuit is obviated. The output winding of each core therefore should advantageously comprise more turns than the input winding of the succeeding core in the shift register and the bias 20 should be so chosen as to be overcome by the voltage induced in the output winding of a core but not by the voltage induced in the input or set winding of the same core upon reversal of the state of magnetization of that core.

Similarly, the pulse stored in core 32 may be transferred to core 34 by the application of a positive pulse from source 25 to winding 31. This pulse will produce a flux in the downward direction, having been reflected off mirror symbol 31, which flux will switch the remanent magnetization of core 32 and thus produce a current from right to left through coil 33. Similarly, this current will flow from right to left through coil 37 of core 34 and render transistor 16 conductive. In each instance where a pulse is applied to the base of a transistor on the transfer of information to an associated core from a prior core in the register or from an information source, the transistor so pulsed conducts temporarily because bias of the battery 20 is overcome by the transferred pulse. As a result, this particular transistor conducts pulses from source 12 to the matrix column electrode 13 which is connected to the conducting transistor. At the same time, in accordance with the invention, the transistors prevent the unwanted transfer of information in a reverse direction through the shift register. As explained above, the voltages induced in the input windings of the cores are inadequate to overcome the bias voltage of battery 20. Thus, only those transistors receiving pulses induced in output windings of storage cores are rendered conductive, and the transfer of information through the shift register is restricted to the forward direction.

If the output coil on the last core of the shift register is connected to the input coil 29 of core 26 as well as to a transistor base, the stored pulse will be transferred continuously throughout the shift register under the influence of pulses from sources 24 and 25, thereby sequentially rendering the transistors conductive and permitting the sequential application of pulses from source 12 to the column electrodes of the matrix.

It is to be understood that the above-described arrangements are illustrative of the application of the principles of the invention. Numerous other arrangements may be devised by those skilled in the art without departing from the spirit and scope of the invention.

What is claimed is:

1. A magnetic core circuit comprising a plurality of output leads, a plurality of magnetic cores arranged in two groups, each of said cores having an input, output, and shift winding thereon, means alternately applying shift pulses to said shift windings of said two groups, a transistor for each of said cores, said transistor having a plurality of electrodes including a first electrode connected to one of said output leads, means devoid of concentrated impedances connecting a second electrode of each of said transistors in series with the input winding of one of said cores and the output winding of the immediately prior core, and means connected to a third electrode biasing said transistors normally to their nonconducting state.

2. A magnetic core circuit in accordance with claim 1 wherein said output windings have more turns than said input windings and the bias applied to said transistors is of a value to be overcome by the voltage induced in one of said output windings on reversal of the state of magnetization of a core but not to be overcome by the voltage induced in the input winding of the same core on reversal of the state of magnetization of said core.

3. A magnetic core circuit comprising a plurality of magnetic cores each having an input, an output, and a shift winding thereon, means alternately applying shift pulses to the shift windings of one alternate group of cores and the shift windings of the other alternate group of cores, a transistor for each of said cores, said transistor having a first, a second, and a third electrode, an output lead connected to the first electrode of each transistor, means devoid of concentrated impedances connecting the second electrode of each transistor in series with the input winding of one of said cores and the output winding of the immediately preceding core, and means applying a signal to said third electrodes to be gated to said output leads by said transistors.

4. A magnetic core circuit in accordance with claim 3 further comprising means for applying a bias voltage to said third electrodes, said bias voltage being overcome by transfer of a pulse between the output winding of the prior core and the input winding of a core.

References Cited in the file of this patent

UNITED STATES PATENTS

| | | |
|---|---|---|
| 2,629,834 | Trent | Feb. 24, 1953 |
| 2,695,397 | Anderson | Nov. 23, 1954 |
| 2,735,021 | Nilssen | Feb. 14, 1956 |
| 2,772,357 | An Wang | Nov. 27, 1956 |